United States Patent [19]

Mahany et al.

[11] Patent Number: 5,682,379
[45] Date of Patent: Oct. 28, 1997

[54] WIRELESS PERSONAL LOCAL AREA NETWORK

[75] Inventors: Ronald L. Mahany; Alan G. Bunte; Ronald E. Luse, all of Cedar Rapids, Iowa; Guy J. West, Duluth, Ga.; Charles D. Gollnick, Antioch, Tenn.

[73] Assignee: Norand Corporation, Cedar Rapids, Iowa

[21] Appl. No.: 500,977

[22] PCT Filed: Dec. 23, 1993

[86] PCT No.: PCT/US93/12628

§ 371 Date: Apr. 4, 1996

§ 102(e) Date: Apr. 4, 1996

[87] PCT Pub. No.: WO94/15413

PCT Pub. Date: Jun. 7, 1994

[51] Int. Cl.⁶ .................... H04B 7/204; H04L 12/28
[52] U.S. Cl. .................... 370/311; 370/315; 370/338; 370/401; 370/465; 455/11.1; 455/38.3; 455/54.1; 455/343
[58] Field of Search ................ 370/310, 311, 370/313, 315, 328, 337, 338, 347, 349, 401, 465, 466; 455/11.1, 33.1, 38.3, 54.1, 56.1, 95, 343; 379/58, 59, 61; 375/200

[56] References Cited

U.S. PATENT DOCUMENTS

| | | | |
|---|---|---|---|
| 4,539,706 | 9/1985 | Mears et al. | 455/11.1 |
| 4,606,044 | 8/1986 | Kudo | 370/465 |
| 5,029,183 | 7/1991 | Tymes | 375/200 |
| 5,179,721 | 1/1993 | Comroe et al. | 455/33.1 |
| 5,220,678 | 6/1993 | Feei | 455/343 |
| 5,241,542 | 8/1993 | Natarajan et al. | 370/311 |
| 5,295,154 | 3/1994 | Meier et al. | 370/401 |
| 5,339,316 | 8/1994 | Diepstraten | 370/401 |

Primary Examiner—Hassan Kizou
Attorney, Agent, or Firm—Stanford & Bennett, L.L.P.

[57] ABSTRACT

A transceiver apparatus for creating a wireless personal local area network between a computer terminal and one or more peripheral devices. A separate transceiver is connected to the computer terminal and to each peripheral device. The transceivers can be connected to the terminal or peripheral device either internally or externally. A low power radio is used to communicate information between the computer terminal and peripheral devices. Different transceivers can be used for modifying the carrier frequency and power of the local area network. The microprocessor is located inside each transceiver and controls the information flow of the transceiver including the communication protocol which allows each device to know if other devices are communicating, which devices are being communicated to, and selectively address the peripheral devices. An Idle Sense communication protocol is used for information transfer between the computer terminal and the peripheral devices, increasing efficiency in power management and compensating for transmission collisions.

9 Claims, 10 Drawing Sheets

WIRELESS PERSONAL LOCAL AREA NETWORK

BACKGROUND OF THE INVENTION

Computer terminals and peripheral devices are now used in practically every aspect of life. Computer terminals come in all shapes and sizes and vary greatly in terms of function, power and speed. Additionally, the number of peripheral devices which can be attached to the computer terminals is increasing. Many peripheral devices exist such as printers, modems, graphics, scanners, text scanners, codes readers, magnetic card readers, external monitors, voice command interfaces, external storage devices, and so on.

Computer terminals and peripherals have become dramatically smaller and more portable. Personal computers and peripherals are small enough to sit on the desk at work. Smaller still are leap top computers and notebook computers. There are computer terminals which are small enough to be mounted in a vehicle such as a delivery truck or on a fork lift. Still smaller are the hand held terminals typically used for their portability features where the user can carry the computer terminal in one hand and operate it with the other.

Despite the reduction in computer size, the computer terminal still must physically interface with the peripheral devices. Thus, there must either be a cable running from one of the computer terminal to each device or the computer terminal must be docked with the device while the information transfer is to take place.

In the office or work place setting, the physical connection is typically done with cables. These cables pose several problems. If there are many peripheral devices, there must be many cables attached to the computer terminal. In addition to the eyesore created by all of the cables, the placement of the peripheral devices is limited by the length of the cable. Longer cables can be used but they are costly and do not alleviate the eyesore created by having cables running in all directions. Additionally, there may be a limited number of ports on the computer terminal thus limiting the number of peripherals that can be attached.

Another problem exists when there are several computer terminals which must share the same peripheral device such as a printer. All of the computers must be hardwired to the printer. As discussed above, long cables can fix this problem at least from a physical connection perspective but there still remains a protocol problem between the different computers. This problem is especially severe when the various computers are of different types such as a mixed environment of IBM's and Macintoshes.

In the smaller computer terminal setting, the hand-held terminals and the potables, the cabling and connection problem can be more severe and cumbersome. Peripheral devices such as printers and scanners of all types have been reduced dramatically in size to match the smallness of the computer terminals. A notebook computer operator may wish to carry the computer and a cellular phone modem in a briefcase. Similarly, an operator may wish to have a hand-held computer terminal in one hand, a small portable printer attached to his belt, and a code reader in the other hand. The smallness of the computers and peripherals makes these demands possible but the required cabling makes these demands costly, inconvenient and even dangerous.

Physically connecting the computer terminals and peripherals severely reduces the efficiency gained by making the units smaller. An operator must somehow account for all of the devices in a system and keep them all connected. This can be very invonveient. In the notebook computer and modem example, the operator may wish to have freedom to move around with the computer but without the modem. He may, for example, wish to work in various locations on a job sight and at various times transmit or receive information via his modem. If the modem and the computer are hard wired together, he must either carry the modem with him at all time or connect it and then disconnect it each time he wishes to use the modem. Similarly, the operator of the hand held terminal, code reader and printer will have the feeling of being all tied up while using the three devices simultaneously when all three devices are connected with cables.

The physical connections created by cabling can be expensive because cables frequently prove to be unreliable and must be replaced frequently. In portable environments, cables are subject to frequent handling, temperature extremes, dropping and other physical trauma. It is not uncommon for the cables or the connectors for the cables on the devices to need replacing every three months or so. Additionally, all of the cabling can be dangerous. An operator who is using, holding or carrying several devices and feels all tied up is not just inconvenienced, he may be severely limited in his mobility and flexibility as he moves about the work area. This loss of mobility and flexibility directly undercuts the entire reason for having small and portable computers and peripheral devices and greatly increases the likelihood of operator injury while using the computer and peripheral devices.

Furthermore, as the cables wear out and break, which, as mentioned, happens frequently, there are dangers which are associated with the electrical current running through the cables. If the cable or connectors break, the current could shock the operator or create a spark which could cause a fire or even an explosion in some work environments.

Attempts to alleviate or eliminate these problem have been made but have not been greatly successful. One solution is to incorporate a computer terminal and all of the peripherals into one unit. However, this solution proves unsatisfactory for several reasons. For example, the incorporation of many devices into one unit greatly increases the size and weight, thus jeopardizing the portability of the unit. Furthermore, incorporating all of the functions into one unit greatly reduces and, in most cases eliminates, the flexibility of the overall system. A user may only wish to use a hand-held computer terminal at times, but at other times may also need to use a printer or occasionally a code reader. An all-incorporated unit thus becomes either overly large because it must include everything, or very limiting because it does not include everything.

Another solution has been to set up Local Area Networks (LAN's) utilizing various forms of RF (Radio Frequency) communication. The LAN's to date, however, have been designed for large scale wireless communications between several portable computer terminals and a host computer. Therein, the host computer, itself generally a stationary device, manages a series of stationary peripherals that, upon requests to the host, may be utilized by the portable terminals. Other large scale wireless communications have also been developed which for RF communication between several computer terminals and peripheral devices, cut all proving to be ineffective as a solution. For example, these systems require the peripheral devices to remain active at all times to listen for an occasional communication. Although this requirement may be acceptable for stationary peripheral devices receiving virtually unlimited power (i.e., when plugged into an AC outlet), it proves detrimental to portable peripherals by unnecessarily draining battery power. Similarly, in such systems, the computer terminals are also required to remain active to receive an occasional communication not only from the other terminals or the host but also from the peripherals. Again, often unnecessarily, battery power is wasted.

In addition, such large scale system are designed for long range RF communication and often required either a licensed frequency or must be operated using spread spectrum technology. Thus, these radios are typically cost prohibitive, prove too large for convenient use with personal computers and small peripheral devices, and require a great deal of transmission energy utilization.

Thus, there is a need for a radio frequency communication network that supports the use of network peripherals which solves the foregoing problems relating to power conservation and portability.

SUMMARY OF THE INVENTION

The present invention solves many of the problems inherent. The mobile network device participates as a slave to the first network pursuant to the first protocol and as a master to the second network pursuant to the second protocol, and resolves conflicts between the first and second protocols in communication systems having devices which use battery power. The present invention relates generally to local area networks and, more specifically, to a communication system for maintaining connectivity between devices on networks which have different operating parameters while limiting the power drain of battery powered devices.

In one embodiment of the present invention, a mobile network device has a single radio unit which is capable of participating in a first and second radio network which operate using a first and second communication protocol. The mobile network device participates as a slave to the first network pursuant to the first protocol and as a master to the second network pursuant to the second protocol, and resolves conflicts between the first and second protocols.

In another embodiment of the present invention, a mobile network device has a first radio transceiver for communicating with a main radio network and a second radio transceiver for communicating with a radio subnetwork. The mobile network device participates as a slave to the main radio network and participates as a master to the radio subnetwork.

In a further embodiment of the present invention, a mobile network device has a single radio unit capable of participating in a first and a second radio network. The first and second radio networks operate using a first and second communication protocol, respectively. The mobile network device participates as a slave to the first network pursuant to the first protocol and as a master to the second network pursuant to the second protocol, enters a state of low power consumption when not communicating with either the first or second network.

In another embodiment of the present invention, an RF local area network contains a first network device which uses battery power to transmit data to a second network device. In order to conserve power, the second network device determines a range value between the first and second network devices and transmits that value to the first network device so that the first network device can identify an appropriate, and potentially lower, data rate for subsequent transmission of data. The first network device may also consider its own battery parameters along with the received range value and identify an appropriate power level as well as data rate for subsequent transmissions.

In another similar embodiment, the second network device determines the range value between the first and second network devices and, based on the range value, indicates to the first network device an appropriate, and potentially lower, data rate for subsequent data transmission to the second network device. The second network device may also consider battery parameter information received from the first network device and use that information along with the range value to indicate to the first network device an appropriate power level, as well as data rate, for subsequent transmissions by the first network device.

DETAILED DESCRIPTION OF THE INVENTION

Figure 1A:
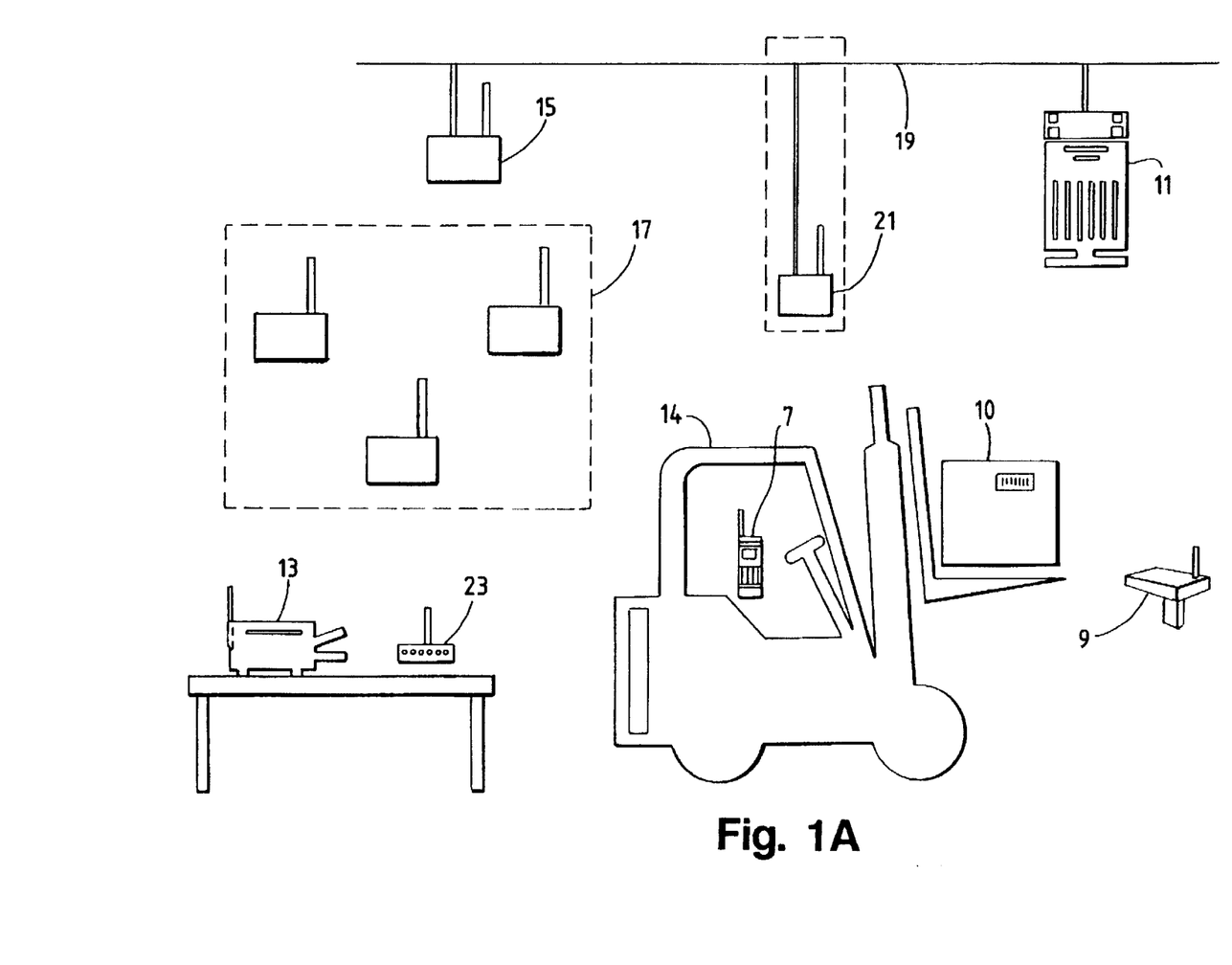
FIG. 1a illustrates a warehouse environment incorporating a communication network which maintains communication connectivity between the various network devices according to the present invention.

FIG. 1a illustrates a warehouse environment incorporating a communication network which maintains communication connectivity between the various network devices according to the present invention. Specifically, a worker utilizes a computer terminal 7 and a code reader 9 to collect data such as identifying numbers or codes on warehoused goods, such as the box 10. As the numbers and codes are collected, they are forwarded through the network to a host computer 11 for storage and cross-referencing. In addition, the host computer 11 may, for example, forward cross-referenced information relating to the collected numbers or codes back through the network for display on the terminal 7 or for printing on a printer 13. Similarly, the collected may be printed from the computer terminal 7 directly to the printer 13. Other exemplary communication pathways supported by the present invention include messages exchanged between the computer terminal 7 and other computer terminals (not shown) or the host computer 11.

Many of the devices found in the illustrative network are battery powered and therefore must conservatively utilize their radio transceivers. For example, the hand-held computer terminal 7 receives its power from either an enclosed battery or a forklift battery (not shown) via a docking station within the forklift 14. Similarly, the code reader 9 operates on portable battery power as may the printer 13. The arrangement of the communication network, communication protocols used, and data rate and power level adjustments help to optimize battery conservation without substantially degrading network performance.

The overall communication network of the present invention is arranged into two functional groups: 1) a main communication network; and 2) a microLAN network. The main communication network in the illustrated warehouse embodiment includes a hard-wired backbone LAN 19 and base stations 15 and 17. A host computer 11 and any other non-mobile network device located in the vicinity of the backbone LAN 19 can be directly attached to the backbone LAN 19. However, mobile devices and remotely located devices must maintain connectivity to the backbone LAN 19 through either a single base station such as the base station 15, or through a multi-hop network of base stations such as is illustrated by the base stations 15 and 17. The base stations 15 and 17 contain a higher power transmitter, and provide coverage over the entire warehouse floor. Although a single base station may be sufficient, if the warehouse is too large or contains interfering physical barriers, the multi-hop plurality of base stations 17 may be necessary. Otherwise, the backbone LAN 19 must be extended to connect all of the base stations 17 directly to provide sufficient radio coverage. Through the main communication network, relatively stable, long range wireless and hard-wired communication is maintained.

Network devices that are mobile or remote (i.e., cannot be directly connected to the backbone LAN 19) are fitted with RF transceivers. To guarantee that such a network device will be able to directly communicate with at least one of the base stations 15 and 17, the fitted transceiver is selected to yield approximately the same transmission power as do the base stations 15 and 17. However, not all mobile or remote network devices require a direct RF link to the base stations 15 and 17, and some may not require any link at all. Instead, communication is generally localized to a small area and, as such, only requires relatively lower power, short range transceivers. The devices which participate in the localized, short range communication, form what is termed herein a "microLAN". For example, the interaction between peripheral devices such as the printer 13, modem 23, and code reader 9 with the terminal 7 provide a justification for a microLAN configuration.

For example, the printer 13 may be located in a dock with the sole assignment of printing out forms based on the code information gathered from boxes delivered to the dock. In such an example, only when the forklift 14 enters the dock area should the printer 13 begin printing the collected code information. Within the dock area, communicating via the base stations 15 and 17 with the required high powered transceivers is avoided by establishing a microLAN on the dock. Specifically, instead of the high powered transceivers for communicating with the main communication network, the printer 13 is fitted with a low power microLAN transceiver for short range communication directly to the computer terminal 7 in the forklift 14. The computer terminal 7 is also fitted with a transceiver capable of direct, low power communication with the printer 13. Thus, when within microLAN radio range of the printer 13, the computer terminal 7 transmits the code information at a relatively low power level to the printer 13. While in range (whether printing or not), the computer terminal 7 and printer 13 together participate in a low power, microLAN network.

In the previous example, no communication was necessary between the microLAN devices and the main network. However, other microLAN configurations require at least some access to the main network. For example, because of battery constraints, the code reader 9 is also fitted with a microLAN transceiver. Whenever the code reader 9 is used, collected code signals and counterpart information are not directly exchanged with the host computer 11 via the main network. Instead, in the illustrated example, the computer terminal 7 is configured to be able to communicate not only within the microLAN but also through the main communication network. This is accomplished by fitting the computer terminal 7 with a transceiver(s) capable of communicating on both networks (see discussion related to FIG. 3 below). Thus, to reach the host computer 11, the code reader 9 first transmits to the computer terminal 7 via the microLAN, i.e., through the microLAN transceivers in each device. Upon receipt of the data, the computer terminal 7 relays the information to one of the base stations 15 and 17 for forwarding to the host 11. Communication from the host 11 to the code reader 9 is accomplished via the same pathway.

It is also possible for any two devices in the microLAN network to communicate to each other. For example, the modem 23 could receive data and directly transmit it to the printer 13 for printing. Similarly, the code reader 9 might choose to directly communicate code signals to other network devices via the modem 23.

In an alternate configuration, a microLAN base station 21 is provided which may be directly connected to the backbone LAN 19 (as shown) or indirectly connected via the base stations 15 and 17. The microLAN base station 21 is positioned in the vicinity of a other microLAN network devices and thereafter becomes a participant. Thus, microLAN communication flowing to or from the main communication network avoids high power radio transmissions altogether. However, it can be appreciated that a stationary microLAN base station may not always be an option when all of the microLAN participants are mobile. In such cases, a high power transmission to reach the main communication network may be required.

As briefly described above, in any microLAN, the participating devices ("microLAN devices") need not all possess the transceiver capability to reach the main communication network. However, at least one microLAN device needs to have that capability to maintain overall network connectivity.

Figure 1B:
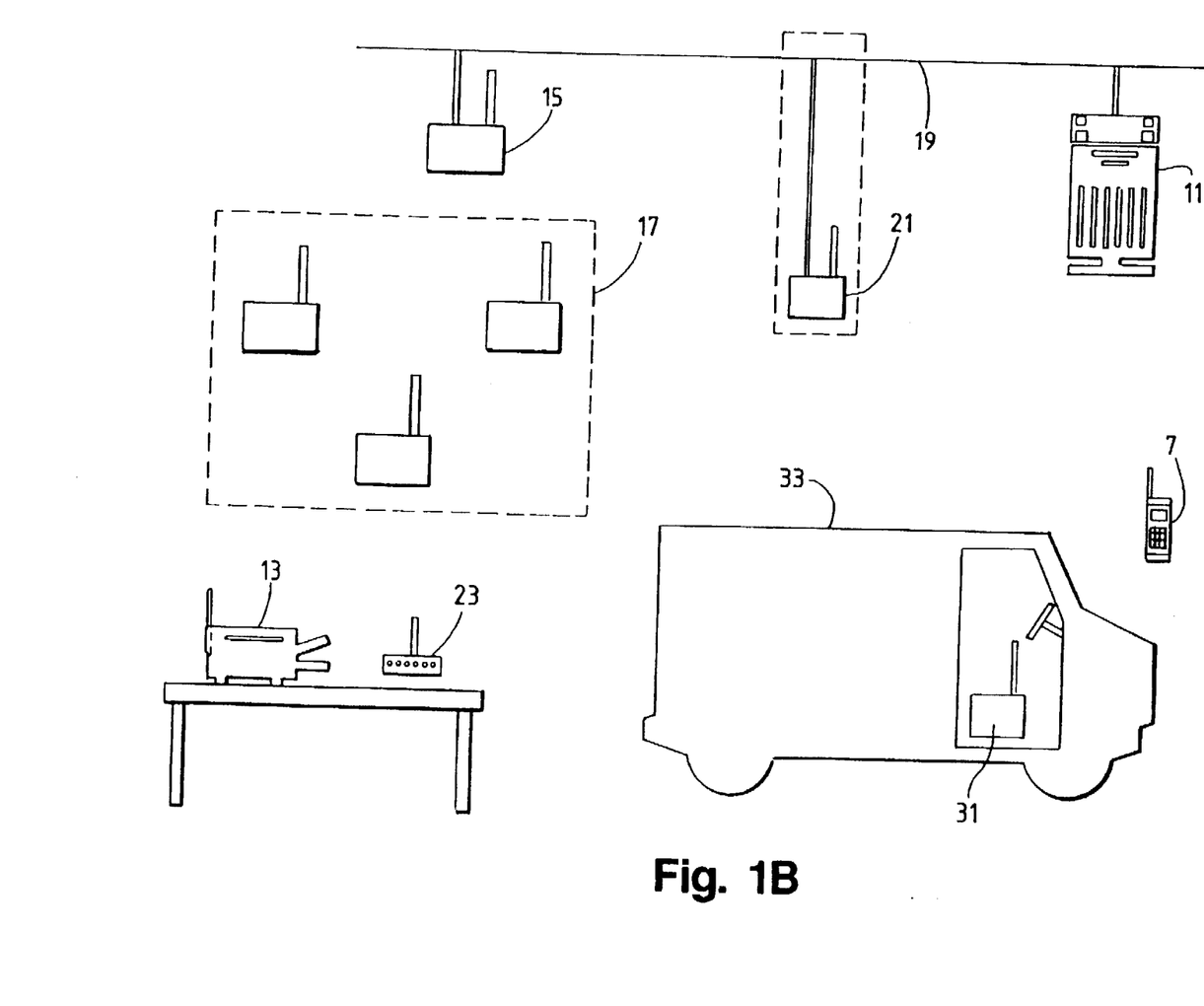
FIG. 1b illustrates other features of the present invention in the use of a mobile vehicle and an associated microLAN network which is capable of detaching from the main communication network when moving out of range of the main network to perform a service, and reattaching to the main network when moving within range to automatically report on the services rendered.

FIG. 1b illustrates other features of the present invention in the use of a mobile vehicle and an associated microLAN network which is capable of detaching from the main communication network when moving out of range of the main network to perform a service, and reattaching to the main network when moving within range to automatically report on the services rendered. In particular, like the forklift 14 of FIG. 1a, a delivery truck 33 provides a focal point for microLAN access. Within the truck 33, a storage terminal 31 is docked so as to draw power from the truck 33's battery supply. The storage terminal 31 is configured with a microLAN transceiver. Similarly, a computer terminal 7 also configured as a microLAN device may either be docked or ported. Because of greater battery access and because of the amount of data to transfer, the storage terminal 31 is also configured to communicate with the main communication network.

Prior to making a delivery, the truck enters a docking area for loading. As goods are loaded into the truck, the driver enters information regarding each loaded good into the storage terminal 31 via either the terminal 7 or the code reader 9 (FIG. 1a) using the microLAN network communications. This loading might also be accomplished automatically as the forklift 14 comes into range of the delivery truck 31, joins the microLAN network, and transmits the previously collected data as described above in relation to FIG. 1a. In addition, as information regarding a good is received and stored, the storage device might also request further information regarding any or all of the goods via the microLAN's link to the host computer 11 through the main communication network. Specifically, the microLAN base station 21 if located on the dock could provide a direct low power microLAN connection to the backbone LAN 19 and to the host computer 11. Otherwise, because of the normal data flow pathway and because of its greatest access to available power, the storage terminal 31 is configured with a transceiver capable of communicating with the main communication network via the base stations 15 and 17. When fully loaded and prior to leaving the dock, the storage device 31 communicates via the microLAN to the printer 13 to generate a printout of information relating to the loaded goods. In addition, the information is transmitted via the microLAN to the modem 23 for relay to a given destination site. Upon reaching the destination, the storage terminal 31 detects and participates in the microLAN of the delivery site dock. As goods specific goods are unloaded, they are scanned for delivery verification, preventing delivery of unwanted goods. The driver is also informed if goods that should have been delivered are still in the truck. As this process takes place, a report might also be generated via a microLAN printer on the destination dock for signature. Similarly, a microLAN modem on the destination dock might relay the delivery information back to the host computer 11 for billing information.

Similarly, if the truck 33 is used for service purposes, the truck 33 leaves the dock in the morning with the addresses and directions of the service destinations, technical manuals, and service notes which have been selectively downloaded from the host computer via the main network and microLAN to the storage terminal 31. Upon pulling out of range of the microLAN network in the dock, the storage terminal 31 and the computer terminal 7 automatically form an independent, detached microLAN. At each service address, the driver collects information using the terminal 7 either as the data is collected if within microLAN transmission range of the storage terminal 31, or as soon as the terminal 7 comes within range. Through the detached microLAN network such information is available on the computer terminal. Upon returning to the dock, as soon as the independent microLAN formed between the storage terminal 31 and the computer terminal 7 come within microLAN range of the microLAN devices on the dock, the detached microLAN automatically merges with the dock's microLAN (becomes "attached"), and the storage terminal 31 automatically transfers the service information to the host computer 11 which uses the information for billing and in formulating the service destinations which will be automatically downloaded the next day.

Figure 2:
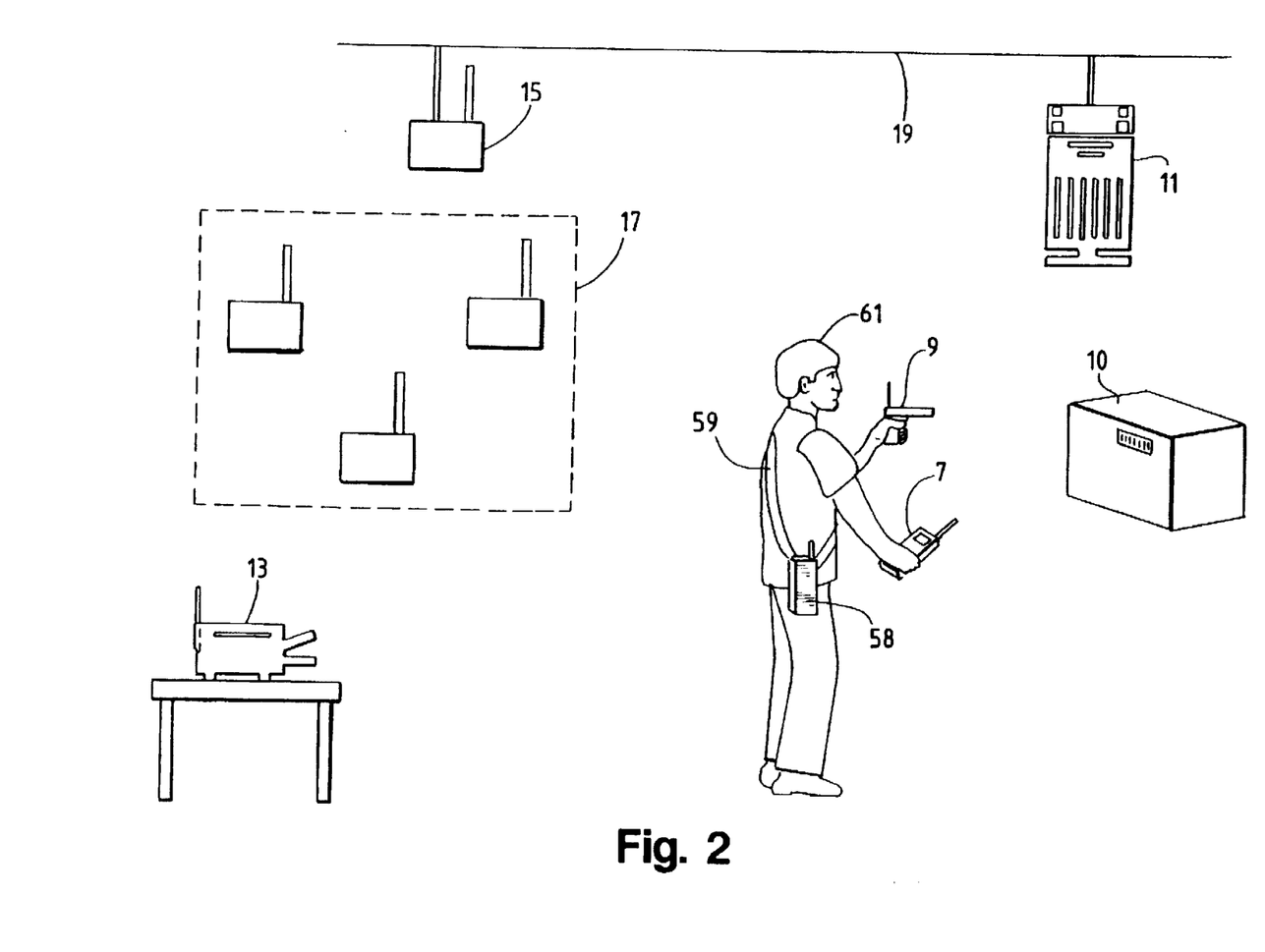
FIG. 2 is a diagrammatic illustration of the use of a microLAN supporting roaming data collection by an operator according to the present invention.

FIG. 2 is a diagrammatic illustration of another embodiment using a microLAN to supporting roaming data collection by an operator according to the present invention. As an operator 61 roams the warehouse flood he carries with him a microLAN comprising the terminal 7, code reader 9 and a portable printer 58. The operator collect information regarding goods, such as the box 10, with the code reader 9 and the terminal 7. If the power resources are equal, the terminal 7 may be designated to also communicate with the main communication network. Specifically, corresponding information to the code data must be retrieved from the host computer 11, collected code information and retrieved corresponding information needs to be displayed on the terminal 7, and, after viewing for verification the information needs to be printed on the printer 58. Because of this data flow requirement, the computer terminal 7 is selected as the microLAN device which must also carry the responsibility of communicating with the main communication network.

If during collection, the operator decides to power down the computer terminal 7 because it is not needed, the microLAN network becomes detached from the main communication network. Although it might be possible for the detached microLAN to function, all communication with the host computer 11 through the main communication network is placed in a queue awaiting reattachment. As soon as the detached microLAN comes within range of an attached microLAN device, i.e., a device attached to the main network, the queued communications are related to the host.

To avoid detachment when the terminal 7 is powered down, the code reader 9 may be designated as a backup to the terminal 7 for performing the higher power communication to the main communication network. As described in more detail below in reference to FIG. 6c regarding the idle sense protocol, whenever the code reader 9 determines that the terminal 7 has stopped providing access to the main communication network, the code reader 9 will take over the role if it is next in line to perform the backup service. Thereafter, when the computer terminal 7 is powered up, it monitors the microLAN channel, requests and regains from the code reader 9 the role of providing an interface with the main computer network. This, however, does not restrict the code reader 9 from accessing the main computer network although the reader 9 may choose to use the computer terminal 7 for power conservation reasons.

In addition, if the computer terminal 7 reaches a predetermined low battery threshold level, the terminal 7 will attempt to pass the burden of providing main network access to other microLAN backup devices. If no backup device exists in the current microLAN, the computer terminal 7 may refuse all high power transmissions to the main communication network. Alternatively, the computer terminal 7 may either refuse predetermined select types of requests, or prompt the operator before performing any transmission to the main network. However, the computer terminal 7 may still listen to the communications from the main communication network and inform microLAN members of waiting messages.

Figure 3:
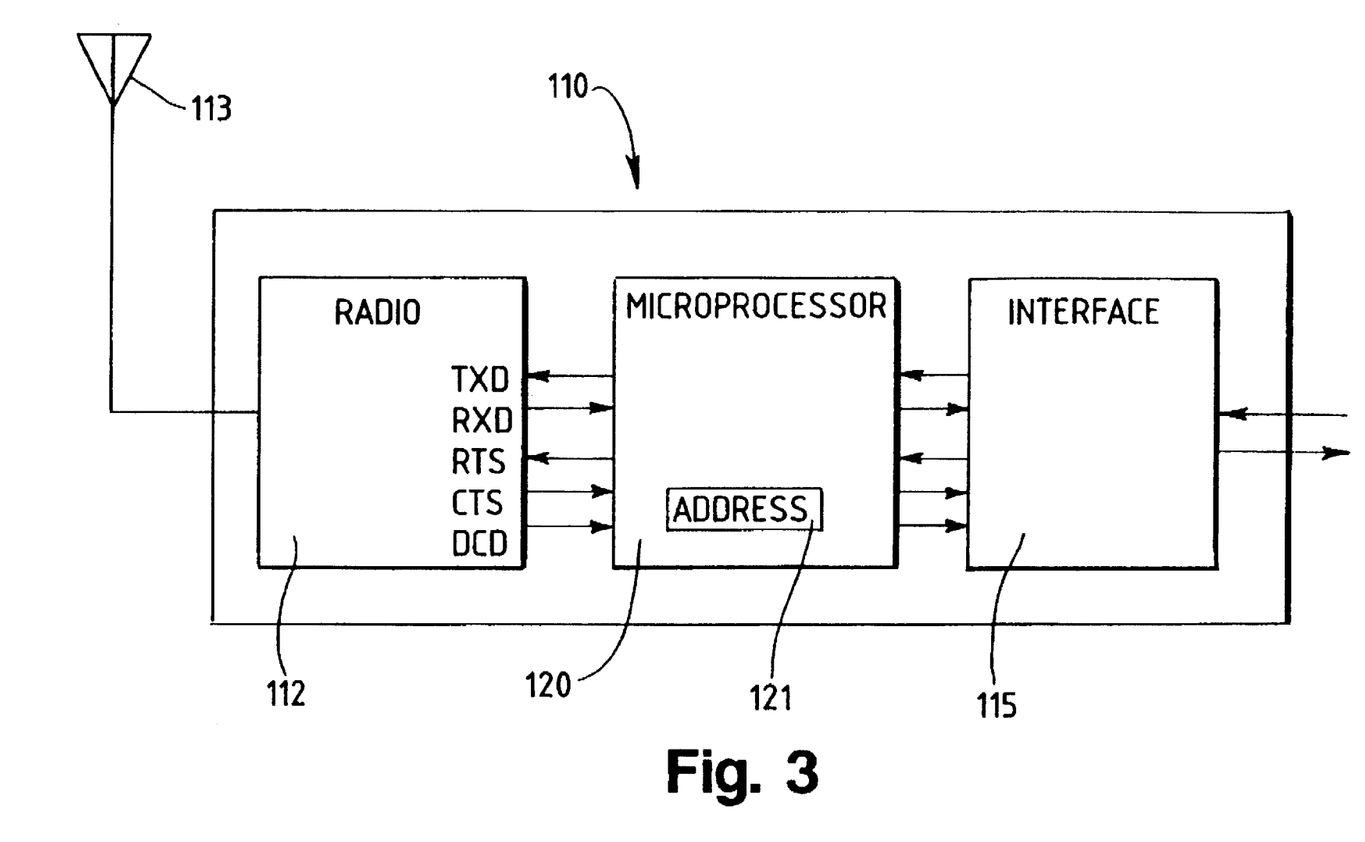
FIG. 3 is a block diagram illustrating the functionality of RF transceivers built in accordance with the present invention.

FIG. 3 is a block diagram illustrating the functionality of RF transceivers built in accordance with the present invention. Although preferably plugging into PCMCIA slots of the compute terminals and peripherals, the transceiver 110 may also be built-in or externally attached via available serial, parallel or ethernet connectors for example. Although the transceivers used by potential microLAN master devices may vary from those used by microLAN slave devices (as detailed below), they all contain the illustrated functional blocks.

In particular, the transceiver 110 contains a radio unit 112 which attaches to an attached antenna 113. The radio unit 112 used in microLAN slave devices need only provide reliable low power transmissions, and are designed to conserve cost, weight and size. Potential microLAN master devices not only require the ability to communicate with microLAN slave devices, but also require higher power radios to also communicate with the main network. Thus, potential microLAN master devices and other non-microLAN slave devices might contain two radio units 112 (or two transceivers 110)—one serving the main network and the other serving the microLAN network—else only contain a single radio unit to service both networks.

In embodiments where cost and additional weight is not an issue, a dual radio unit configuration for potential microLAN master devices provides several advantages. For example, simultaneous transceiver operation is possible by choosing a different operating band for each radio. In such embodiments, a 2.4 GHz radio is included for main network communication while a 27 MHz radio supports the microLAN network. MicroLAN slave devices receive only the 27 MHz radio, while the non-potential microLAN participants from the main network are fitted with only the 2.4 GHz radios. Potential microLAN master devices receive both radios. The low power 27 MHz microLAN radio is capable of reliably transferring information at a range of approximately 40 to 100 feet asynchronously at 19.2K BPS. An additional benefit of using the 27 MHz frequency is that it is an unlicensed frequency band. The 2.4 GHz radio provides sufficient power (up to 1 Watt) to communicate with other main network devices. Many different frequency choices could also be made such as the 900 MHz band, etc.

In embodiments where cost and additional weight are at issue, a single radio unit configuration is used for potential microLAN master devices. Specifically, in such embodiments, a dual mode 2.4 GHz radio supports both the microLAN and main networks. In a microLAN mode, the 2.4 GHz radio operates at a low power level (sub-milliwatt) to support microLAN communication at relatively close distances (20–30 feet). In a high power (up to 1 Watt) or main mode, the 2.4 GHz radio provides relatively long distance communication connectivity with the main network. Although all network devices might be fitted with such a dual mode radio, only microLAN master devices use both modes. MicroLAN slave devices would only use the low power mode while all other main network devices would use only the high power mode. Because of this, to save cost, microLAN slave devices are fitted with a single mode radio operating in the microLAN mode. Non-microLAN participants are also fitted with a single mode (main mode) radio unit for cost savings.

Connected between the radio unit 112 and an interface 110, a microprocessor 120 controls the information flow between through the transceiver 110. Specifically, the interface 115 connects the transceiver 110 to a selected computer terminal, a peripheral device or other network device. Many different interfaces 115 are used and the choice will depend upon the connection port of the device to which the transceiver 110 will be attached. Virtually any type of interface 110 could be adapted for use with the transceiver 110 of the present invention. Common industry interface standards include RS-232, RS-422, RS-485, 10BASE2 Ethernet, 10BASE5 Ethernet, 10BASE-T Ethernet, fiber optics, IBM 4/16 Token Ring, V.11, V.24, V.35, Apple Localtalk and telephone interfaces. In addition, via the interface 115, the microprocessor 120 maintains a radio independent, interface protocol with the attached network device, isolating the attached device from the variations in radios being used.

The microprocessor 120 also controls the radio unit 112 to accommodate communication with the either the main network (for main mode radios), the microLAN (for microLAN radios), or both (for dual mode radios). More specifically, in a main mode transceiver, the microprocessor 120 utilizes a main protocol to communicate with the main network. Similarly, in a microLAN mode transceiver, the microprocessor 120 operates pursuant to a microLAN protocol to communicate in the microLAN network. In the dual mode transceiver, the microprocessor 120 manages the use of and potential conflicts between both the main and microLAN protocols. Detail regarding the main and microLAN protocols can be found in reference to FIGS. 6–9 below.

In addition, as directed by the corresponding communication protocol, the microprocessor 120 controls the power consumption of the radio 112, itself and the interface 115 for power conservation. This is accomplished in two ways. First, the microLAN and main protocols are designed to provide for a low power mode or sleep mode during periods when no communication involving the subject transmitter is desired as described below in relation to FIGS. 6–7. Second, both protocols are designed to adapt in both data rate and transmission power based on power supply (i.e., battery) parameters and range information as described in reference to FIGS. 8–9.

In order to insure that the proper device is receiving the information transmitted, each device is assigned a unique address. Specifically, the transceiver 10 can either have a unique address of its own or can use the unique address of the device to which it is attached. The unique address of the transceiver can either be one selected by the operator or system designer or one which is permanently assigned at the factory such as an IEEE address. The address 121 of the particular transceiver 110 is stored with the microprocessor 120.

In the illustrated embodiments of FIGS. 1–2, the microLAN master device is shown as being either a microLAN base station or a mobile or potable computer terminal. From a data flow viewpoint in considering the fastest access through the network such choices for the microLAN master devices appear optimal. However, any microLAN device might be assigned the role of the master, even those that do not seem to provide an optimal data flow pathway but may provide for optimal battery usage. For example, in the personal microLAN network of FIG. 2, because of the support from the belt 59, the printer might contain the greatest battery capacity of the personal microLAN devices. As such, the printer might be designated the microLAN master device and be fitted with either a dual mode radio or two radios as master devices require. The printer, or other microLAN slave devices, might also be fitted with such required radios to serve only as a microLAN master backup. If the battery power on the actual microLAN master, i.e., the hand-held terminal 7 (FIG. 20, drops below a preset threshold, the backup master takes over.

Figure 4:
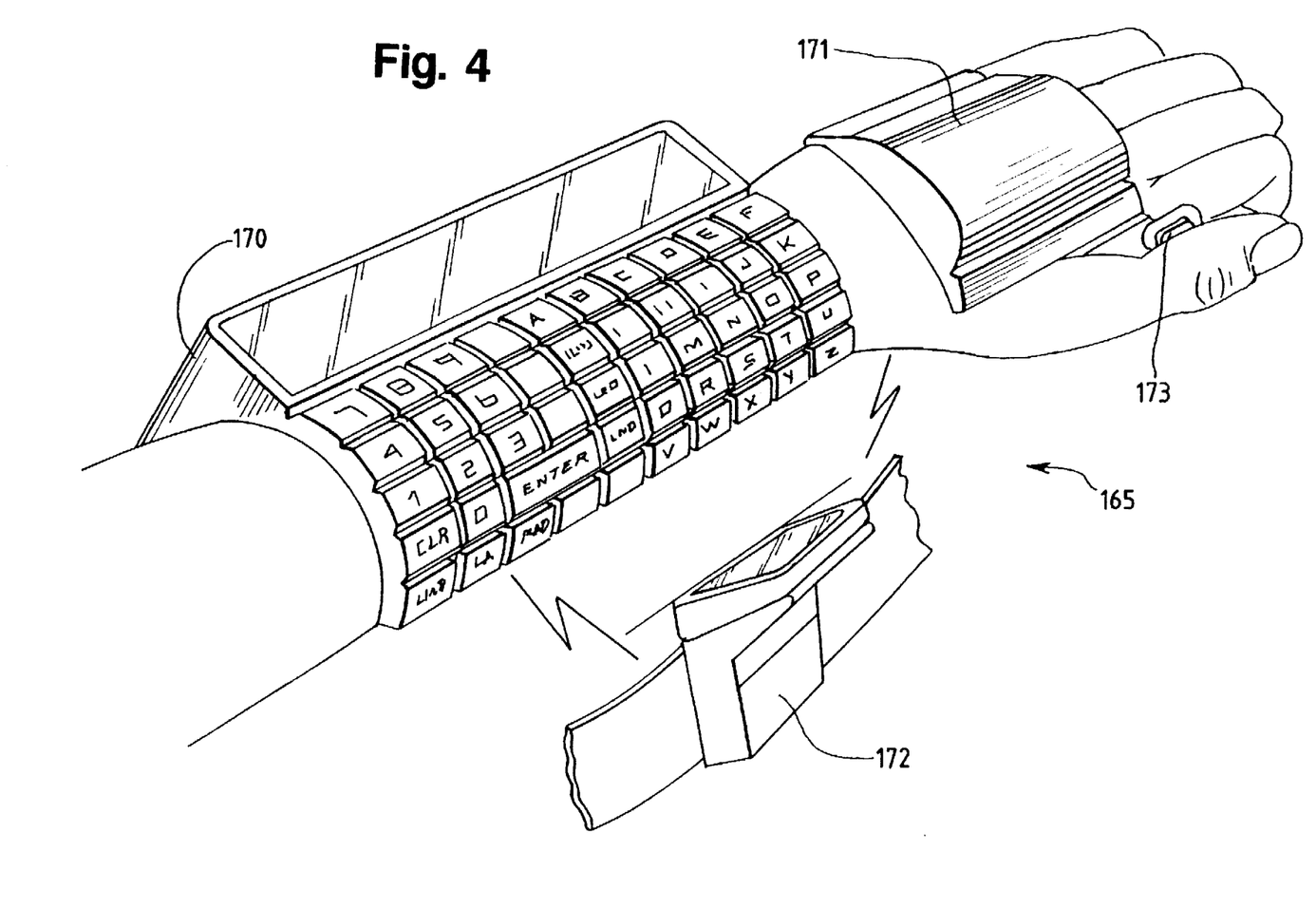
FIG. 4 is a diagrammatic illustration of an alternate embodiment of the personal microLAN shown in FIG. 2.

FIG. 4 is a drawing which illustrates an embodiment of the personal microLAN shown in FIG. 2 which designates a printer as the microLAN master device. Specifically, in a personal microLAN network 165, a computer terminal 170 is strapped to the forearm of the operator. A code reader 171 straps to the back of the hand of the user and is triggered by pressing a button 173 with the thumb. Because of their relatively low battery energy, the computer terminal 170 and code reader 171 are designated microLAN slave devices and each contain a microLAN transceiver having a broadcast range of two meters or less. Because of its greater battery energy, the printer 172 contains a dual mode radio and is designated the microLAN master device.

Figure 5:
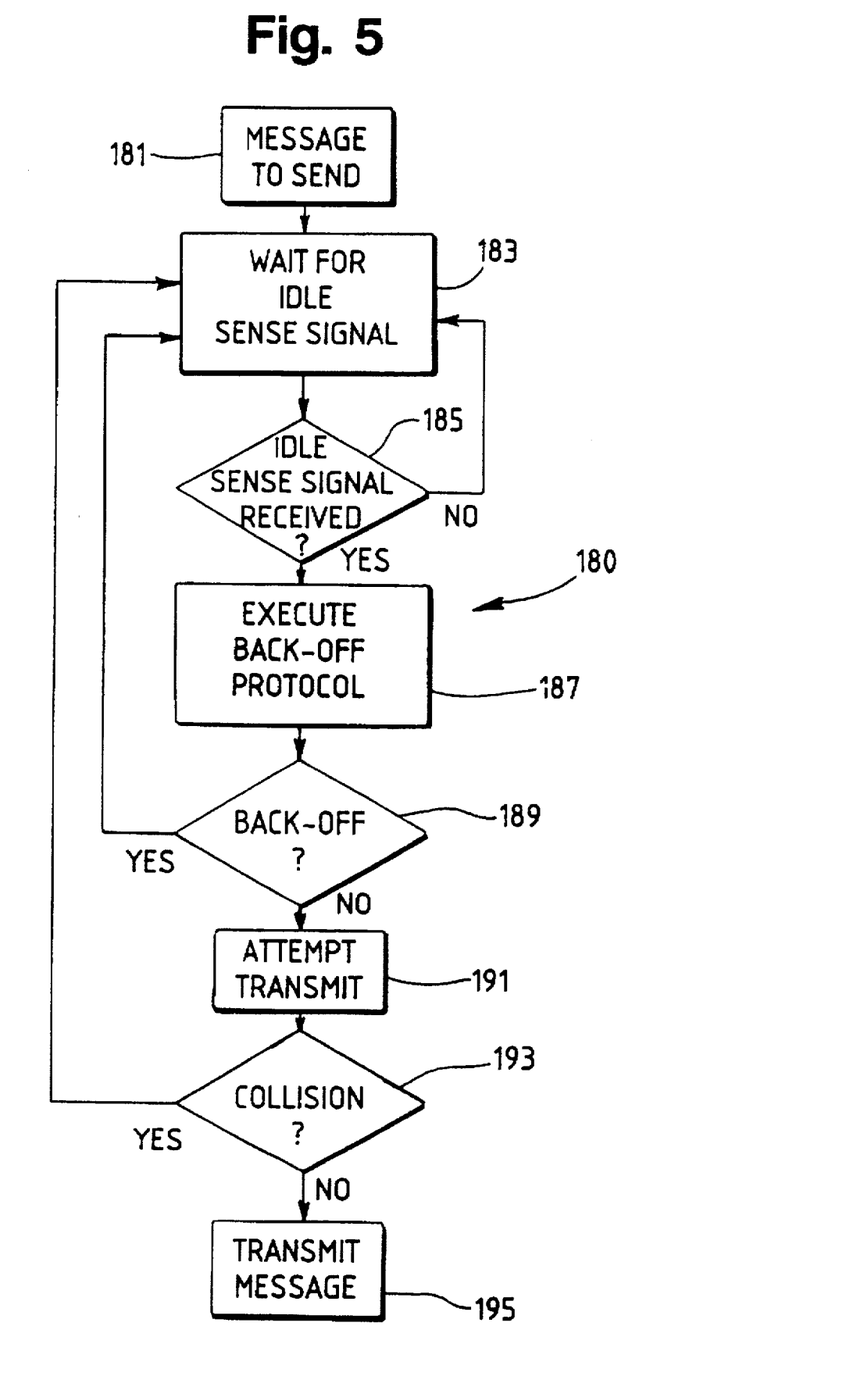
FIG. 5 is a block diagram illustrating a channel access algorithm used by microLAN slave devices in according to the present invention.

FIG. 5 is a block diagram illustrating a channel access algorithm used by microLAN slave devices in according to the present invention. At a block 181, when a slave device has a message to send, it waits for an idle sense message to be received from the microLAN master device at a block 183. When an idle sense message is received, the slave device executes a back-off protocol at a block 187 by in an attempt to avoid collisions with other slave devices waiting to transmit. Basically, instead of permitting every slave device from repeatedly transmitting immediately after an idle sense message is received, each waiting slave is required to first wait for a pseudo-random time period before attempting a transmission. The pseudo-random back-off time period is generated and the waiting takes place at a block 187. At a block 189, the channel is sensed to determine whether it is clear for transmission. If not, a branch is made back to the block 183 to attempt a transmission upon receipt of the next idle sense message. If the channel is still clear, at a block 191, a relatively small "request to send" type packet is transmitted indicating the desire to send a message. If no responsive "clear to send" type message is received from the master device, the slave device assumes that a collision occurred at a block 193 and branches back to the block 183 to try again. If the "clear to send" message is received, the slave device transmits the message at a block 195.

Several alternate channel access strategies have been developed for carrier sense multiple access (CSMA) systems and include 1-persistent, non-persistent and p-persistent. Such strategies or variations thereof could easily be adapted to work with the present invention.

Figure 6A:
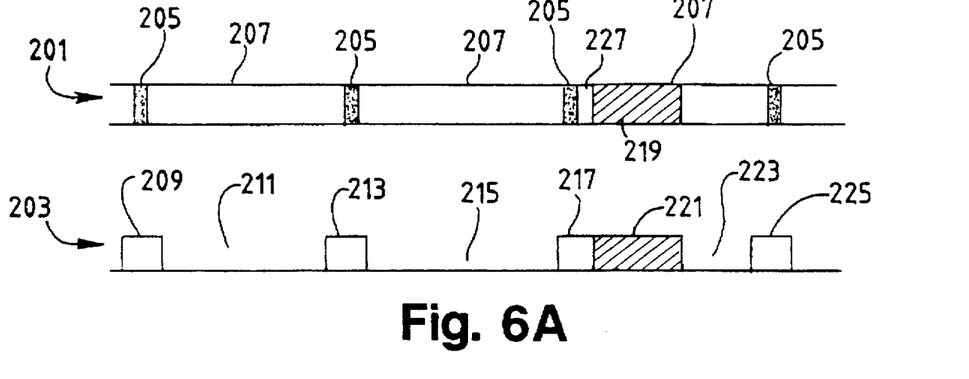
FIG. 6a is a timing diagram of the protocol using according to the present invention illustrating a typical communication exchange between a microLAN master device having virtually unlimited power resources and a microLAN slave device.

FIG. 6a is a timing diagram of the protocol used according to the present invention illustrating a typical communication exchange between a microLAN master device having virtually unlimited power resources and a microLAN slave device. Time line 201 represents communication activity by the microLAN master device while time line 203 represents the corresponding activity by the microLAN slave device. The master periodically transmits an idle sense message 205 indicating that it is available for communication or that it has data for transmission to a slave device. Because the master has virtually unlimited power resources, it "stays awake" for the entire time period 207 between the idle sense messages 205. In other words, the master does not enter a power conserving mode during the time periods 207.

The slave device uses a binding protocol (discussed below with regard to FIG. 6c) to synchronize to the master device so that the slave may enter a power conserving mode and still monitor the idle sense messages of the master to determine if the master requires servicing. For example, referring to FIG. 6a, the salve device monitors an idle sense message of the master during a time period 209, determines that no servicing is required and enters a power conserving mode during the time period 211. The slave then activates during a time period 213 to monitor the next idle sense message of the master. Again, the slave determines that no servicing is required and enters a power conserving mode during a time period 215. When the slave activates again during a time period 217 to monitor the next idle sense message, it determines from a "request to send" type message from the master that the master has data for transmission to the slave. The salve responds by sending a "clear to send" type message during the time period 217 and stays activated in order to receive transmission of the data. The master is thus able to transmit the data to the slave during a time period 219. Once the data is received by the salve at the end of the time period 221, the slave again enters a power conserving mode during a time period 223 and activates again during the time period 225 to monitor the next idle sense message.

Alternatively, the slave may have data for transfer to the master. If so, the slave indicates as such to the master by transmitting a message during the time period 217 and then executes a backoff algorithm to determine how long it must wait before transmitting the data. The slave determines from the backoff algorithm that it must wait the time period 227 before transmitting the data during the time period 221. The slave devices use the backoff algorithm in an attempt to avoid the collision of data with that from other slave devices which are also trying to communicate with the master. The backoff algorithm is discussed more fully above in reference to FIG. 5.

The idle sense messages of the master may also aid in scheduling communication between two slave devices. For example, if a first slave device has data for transfer to a second slave device, the first slave sends a message to the master during the time period 209 requesting communication with the second slave. The master then broadcasts the request during the next idle sense message. Because the second slave is monitoring the idle sense message, the second slave receives the request and stays activated at the end of the idle sense message in order to receive the communication. Likewise, because the first slave is also monitoring the idle sense message, it too receives the request and stays activated during the time period 215 to send the communication.

Figure 6B:
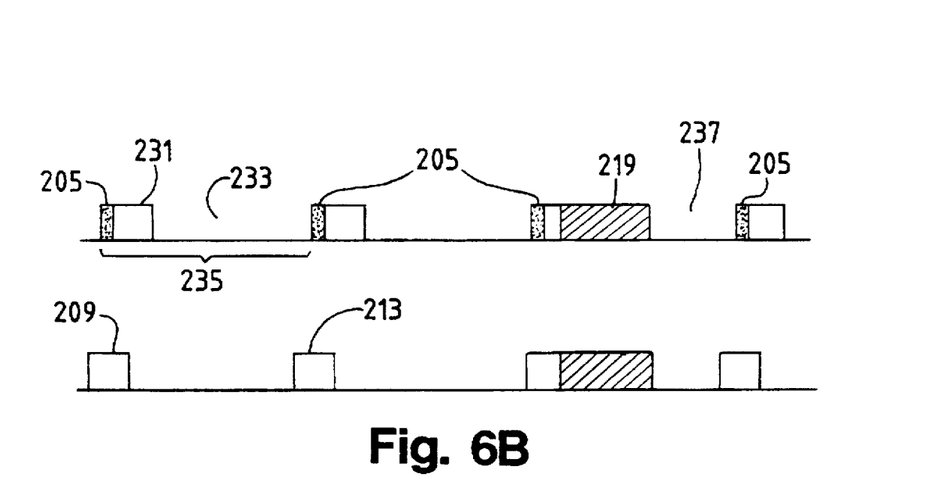
FIG. 6b is a timing diagram of the protocol using according to the present invention illustrating a typical communication exchange between a microLAN master device having limited power resources and a microLAN slave device.

FIG. 6b is a timing diagram of the protocol used according to the present invention illustrating a typical communication exchange between a microLAN master having limited power resources and a microLAN slave device. This exchange is similar to that illustrated in FIG. 6a except that, because it has limited power resources, the master enters a power conserving mode. Before transmitting an idle sense message, the master listens to determine if the channel is idle. If the channel is idle, the master transmits an idle sense message 205 and then waits a time period 231 to determine if any devices desire communication. If no communication is desired, the master enters a power conserving mode during a time period 233 before activating again to listen to the channel. If the channel is not idle, the master does not send the idle sense message and enters a power saving mode for a time period 235 before activating again to listen to the channel.

Communication between the master and slave devices is the same as that discussed above in reference to FIG. 6a except that, after sending or receiving data during the time period 219, the master device enters a power conserving mode during the time period 237.

Figure 6C:
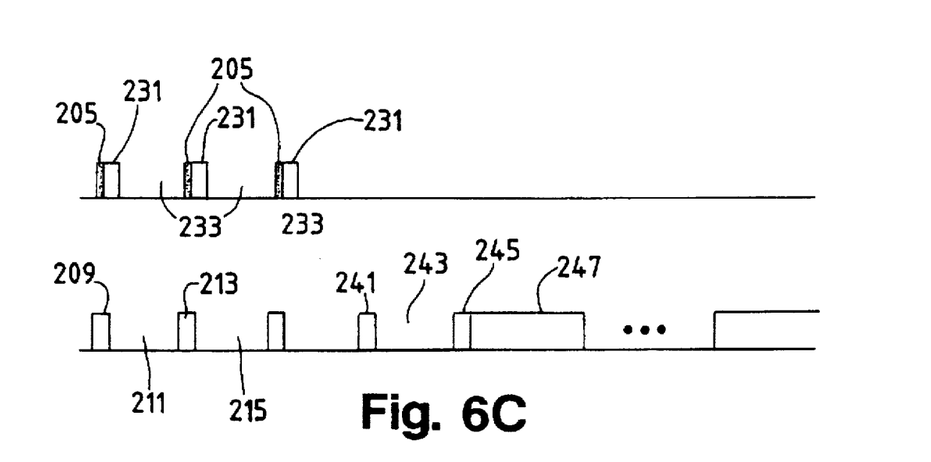
FIG. 6c is also a timing diagram of the protocol used which illustrates a scenario wherein the microLAN master device fails to service microLAN slave devices.

FIG. 6c is also a timing diagram of the protocol used which illustrates a scenario wherein the microLAN master device fails to service microLAN slave devices. The master device periodically sends an idle sense message 205, waits a time period 231, and enters a power conserving mode during a time period 233 as discussed above in reference to FIG. 6b. Similarly, the salve device monitors the idle sense messages during time periods 209 and 213 and enters a power conserving mode during time periods 211 and 215. For some reason, however, the master stops transmitting idle sense messages. Such a situation may occur, for example, if the master device is portable and is carried outside the range of the slave's radio. During a time period 241, the slave unsuccessfully attempts to monitor an idle sense message. The slave then goes to sleep for a time period 243 and activates to attempt to monitor a next idle sense message during a time period 245, but is again unsuccessful.

The slave device thereafter initiates a binding protocol to attempt to regain synchronization with the master. While two time periods (241 and 245) are shown, the slave may initiate such a protocol after any number of unsuccessful attempts to locate an idle sense message. With this protocol, the slave stays active for a time period 247, which is equal to the time period from one idle sense message to the next, in an attempt to locate a next idle sense message. If the slave is again unsuccessful, it may stay active until it locates an idle sense message from the master, or, if power consumption is a concern, the slave may enter a power conserving mode at the end of the time period 247 and activate at a later time to monitor for an idle sense message.

In the event the master device remains outside the range of the slave devices in the microLAN network for a period long enough such that communication is hindered, one of the slave devices may take over the functionality of the master device. Such a situation is useful when the slave devices need to communicate with each other in the absence of the master. Preferably, such a backup device has the ability to communicate with devices on the main communication network. If the original master returns, it listens to the channel to determine idle sense messages from the backup, indicates to the backup that it has returned and then begins idle sense transmissions when it reestablishes dominance over the microLAN network.

Figure 7:
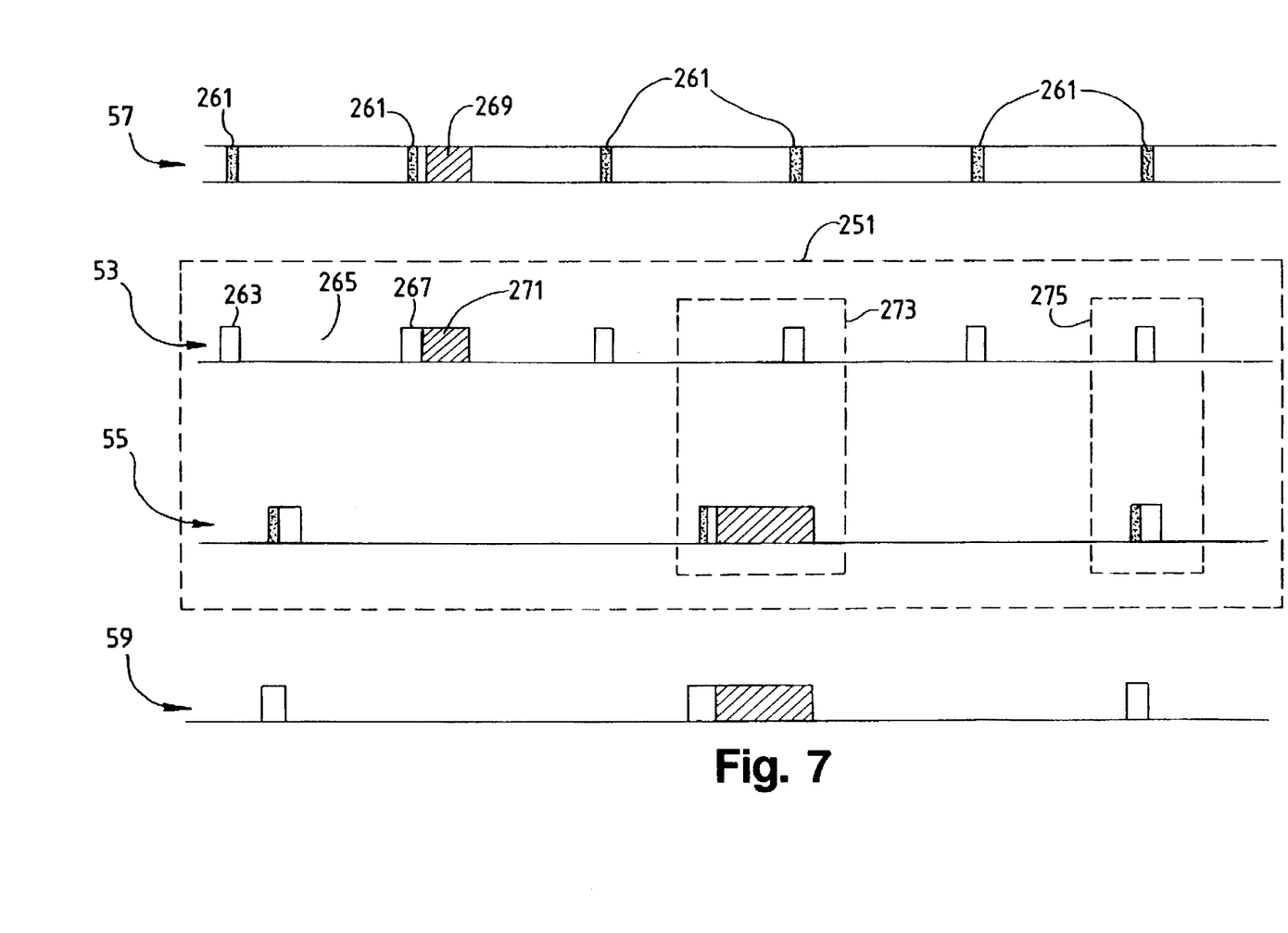
FIG. 7 is a timing diagram illustrating the microLAN master device's servicing of both the high powered main communication network and the low powered microLAN subnetwork, with a single or plural radio transceivers, in accordance with the present invention.

FIG. 7 is a timing diagram illustrating the microLAN master device's servicing of both the high powered main communication network and the low powered microLAN subnetwork, with a single or plural radio transceivers, in accordance with present invention. Block 251 represents typical communication activity of the master device. Line 253 illustrates the master's communication with a base station on the main communication network while line 255 illustrates the master's communication with a slave device on the microLAN network. Lines 257 and 259 illustrate corresponding communication by the base station and slave device, respectively.

The base station periodically broadcasts HELLO messages 261 indicating that it is available for communication. The master device monitors the HELLO messages during a time period 263, and, upon determining that the base does not need servicing, enters a power conserving mode during a time period 265. The master then activates for a time period to monitor the next HELLO message from the base. If the master has data to send to the base, it transmits the data during a time period 271. Likewise, if the base has data to send to the master, the base transmits the data during a time period 269. Once the data is received or sent by the master, it may again enter a power conserving mode. While HELLO message protocol is discussed, a number of communication protocols may be used for communication between the base and the master device. As may be appreciated, the microLAN master device acts as a slave to base stations in the main communication network.

Generally, the communication exchange between the master and the salve is similar to that described above in reference to FIG. 6b. Block 273, however, illustrates a situation where the master encounters a communication conflict, i.e., it has data to send to or receive from the slave on the subnetwork at the same time it will monitor the main network for HELLO messages from the base. If the master has two radio transceivers, the master can service both networks. If, however, the master only has one radio transceiver, the master chooses to service one network based on network priority considerations. For example, in block 273, it may be desirable to service the slave because of the presence of data rather than monitor the main network for HELLO messages from the base. On the other hand, in block 275, it may be more desirable to monitor the main network for HELLO messages rather than transmit an idle sense message on the subnetwork.

Figure 8:
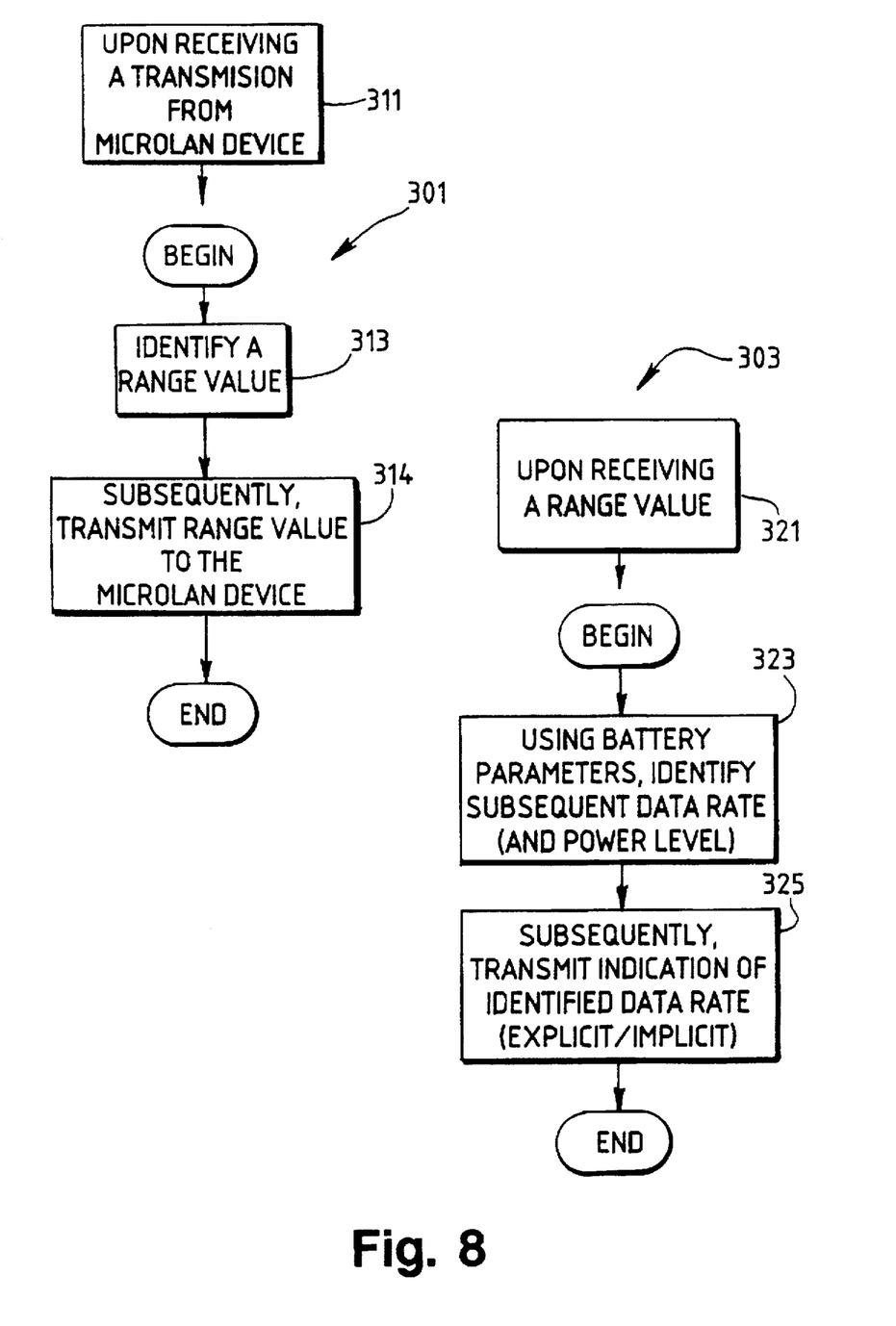
FIGS. 8 and 9 are block diagrams illustrating additional power saving features according to the present invention wherein ranging and battery parameters are used to optimally select the appropriate data rate and power level of subsequent transmissions.
Figure 9:
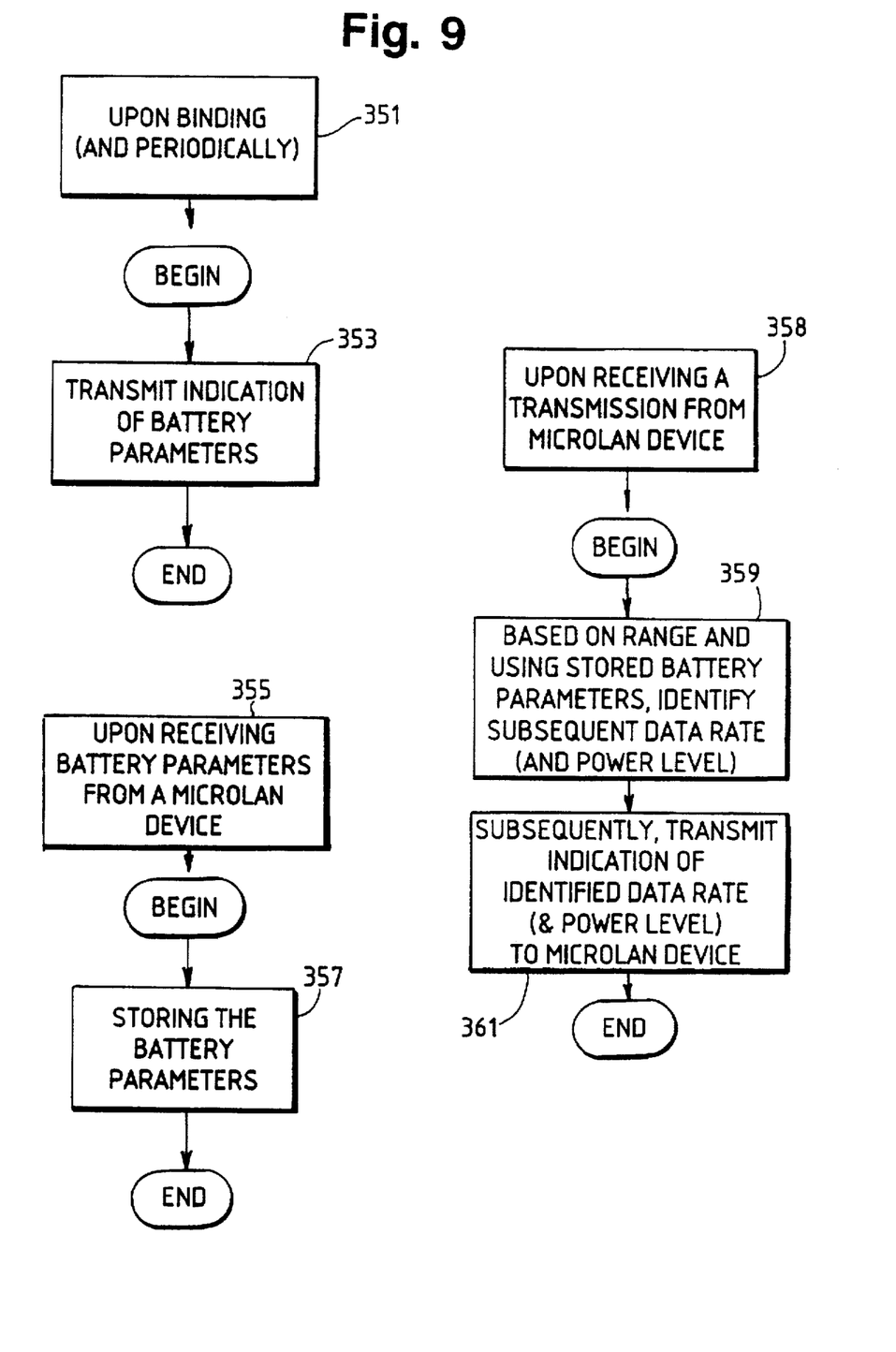

FIGS. 8 and 9 are block diagrams illustrating additional power saving features according to the present invention, wherein ranging and battery parameters are used to optimally select the appropriate data rate and power level for subsequent transmissions. Specifically, even though network devices such as the computer terminal 7 in FIGS. 1–2 have the capability of performing high power transmissions, because of battery power concerns, the such devices are configured to utilize minimum transmission energy. For example if By adjusting either the power level and the data rate based. Adjustments are made based on ranging information and on battery parameters. Similarly, within the microLAN network, even though lower power transceivers are used, battery conservation issues also justify the use such data rate and power adjustments. This process is described in more detail below in reference to FIGS. 8 and 9.

More specifically, FIG. 8 is a block diagram which illustrates a protocol 301 used by a destination microLAN device and a corresponding protocol 303 used by a source microLAN device to adjust the data rate and possibly the power level for future transmission between the two devices. At a block 311, upon receiving a transmission from a source device, the destination device identifies a range value at a block 313. In a low cost embodiment, the range value is identified by considering the received signal strength indications (RSSI) of the incoming transmission. Although RSSI circuitry might be placed in all microLAN radios, the added expense may require that only microLAN master devices receive the circuitry. This would mean that only microLAN master devices would perform the function of the destination device. Other ranging values might also be calculated using more expensive techniques such as adding GPS (Global Position Service) circuitry to both radios. In such an embodiment, the range value transmitted at the block 313 would consist of the GPS position of the destination microLAN device. Finally, after identifying the range value at the block 313, the destination device subsequently transmits the range value to the slave device from which the transmission was received.

Upon receipt of the range value from the destination device at a block 321, the source microLAN device evaluates its battery parameters to identify a subsequent data rate for transmission at a block 323. If range value indicates that the destination microLAN device is very near, the source microLAN device selects a faster data rate. When the range value indicates a distant master, the source device selects a slower rate. In this way, even without adjusting the power level, the total energy dissipated can be controlled to utilize only that necessary to carry out the transmission. However, if constraints are placed on the maximum or minimum data rates, the transmission power may also need to be modified. For example, to further minimize the complexity associated with a fully random range of data rate values, a standard range and set of several data rates may be used. Under such a scenario, a transmission power adjustment might also need to supplement the data rate adjustment. Similarly, any adjustment of power must take into consideration maximum and minimum operable levels. Data rate adjustment may supplement such limitations. Any attempted modification of the power and data rate might take into consideration any available battery parameters such as those that might indicate a normal or current battery capacity, the drain on the battery under normal conditions and during transmission, or the fact that the battery is currently being charged. The latter parameter proves to be very significant in that when the battery is being charged, the microLAN slave device has access to a much greater power source for transmission, which may justify the highest power transmission and possibly the slowest data rate under certain circumstances.

Finally, at a block 325, an indication of the identified data rate is transmitted back to the destination device so that future transmissions may take place at the newly selected rate. The indication of data rate may be explicit in that a message is transmitted designating the specific rate. Alternately, the data rate may be transferee implicitly in that the new rate is chose and used by the source, requiring the destination to adapt to the change. This might also be done using a predetermined header for synchronization.

FIG. 9 illustrates an alternate embodiment for carrying out the data rate and possibly power level adjustment. At a block 351 upon binding and possibly periodically, the source microLAN device sends an indication of its current battery parameters to the destination microLAN device. This indication may be each of the parameters or may be an averaged indication of all of the parameters together. At a block 355, upon receipt, the destination microLAN device 355 stores the battery parameters (or indication). Finally, at a block 358, upon receiving a transmission from the source device, based on range determinations and the stored battery parameters, the destination terminal identifies the subsequent data rate (and possibly power level). Thereafter, the new data rate and power level are communicated to the source device for either explicitly or implicitly for future transmissions.

Moreover, it will be apparent to one skilled in the art having read the foregoing that various modifications and variations of this communication system according to the present invention are possible and is intended to include all those which are covered by the appended claims.

What is claimed is:

1. A communication system comprising:
   a first radio network operating using a first communication protocol;
   a second radio network operating using a second communication protocol;
   a mobile network device having a single radio unit capable of participating in both the first and second radio networks;
   the mobile network device participating as a slave device to the first radio network pursuant to the first communication protocol while participating as a master device to the second radio network pursuant to the second communication protocol; and
   the mobile network device resolving conflicts between the first and second communication protocols.

2. A communication system comprising:
   a main radio network;
   a radio subnetwork;
   a mobile network device having a first radio transceiver for communicating with the main radio network and a second radio transceiver for communicating with the radio subnetwork;
   the mobile network device participating as a slave device to the main radio network while participating as a master device to the radio subnetwork.

3. A communication system comprising:
   a first ratio network operating using a first communication protocol;
   a second radio network operating using a second communication protocol;
   a mobile network device having a single radio unit capable of participating in both the first and second radio networks;
   the mobile network device participating as a slave device to the first radio network pursuant to the first communication protocol while participating as a master device to the second radio network pursuant to the second communication protocol; and
   the mobile network device entering a state of low power consumption when not communicating with either the first or the second radio network.

4. A communication system comprising:
   a first radio network comprising a first plurality of network devices;
   a second radio network comprising a second plurality of network devices;
   a mobile network device configured to participate as a member of both the first and second pluralities of network devices;
   when within range of one of the second plurality of network devices, the mobile network device participates as a master device in the second radio network; and
   when within range of one of the first plurality of network devices, the mobile network device participates as a slave device in the first radio network; pl the second plurality of network devices entering a state of low power consumption when communication with the mobile network device is not available.

5. A communication system comprising:
   a first radio network comprising a first plurality of network devices;
   a second radio network comprising a second plurality of network devices;
   a mobile network device configured to participate as a member of both the first and second pluralities of network devices;
   when within range of one of the second plurality of network devices, the mobile network device participates as a master device in the second radio network; and
   when within range of one of the first plurality of network devices, the mobile network device participates as a slave device in the first radio network.

6. An RF local area network comprising:
   a first network device, the first network device transmitting using battery power;
   a second network device;
   means within the second network device for identifying a range value indicative of the distance between the first and second network devices;

the second network device responsive to the identifying means by transmitting the range value to the first network device; and the first network device, upon receipt of the range value, identifying an appropriate data rate for subsequent transmission to the second network device.

7. An RF local area network comprising:

a first network device, the first network device transmitting using battery power;

a second network device;

means within the second network device for identifying a range value indicative of the distance between the first and second network devices;

the second network device responsive to the identifying means by indicating to the first network device an appropriate rate for subsequent data transmission to the second network device.

8. An RF local area network comprising:

a first network device;

a battery power supply disposed for powering the first network device, the battery power supply having battery parameter information;

a second network device;

means within the second network device for identifying a range value indicative of the distance between the first and second network devices;

the second network device responsive to the identifying means by sending the range value to the first network device;

means within the first network device for identifying the battery parameter information; and the first network device, based on the received range value and battery parameter information, identifying an appropriate data rate and power level for subsequent transmission to the second network device.

9. An RF local area network comprising:

a first network device;

a battery power supply disposed for powering the first network device, the battery power supply having battery parameter information;

a second network device means within the second network device for identifying a range value indicative of the distance between the first and second network devices;

the first network device transmitting battery parameter information to the second network device; and the second network device, based on the range value and received battery parameter information, indicating to the first network device an appropriate rate and power level for subsequent data transmission.

* * * * *